United States Patent
Weinstock

[15] 3,671,575
[45] June 20, 1972

[54] PROCESS FOR PREPARING VITAMIN A ESTERS

[72] Inventor: Marcel Weinstock, Edgware, England
[73] Assignee: Hoffmann-La Roche Inc., Nutley, N.J.
[22] Filed: Nov. 30, 1970
[21] Appl. No.: 93,817

[52] U.S. Cl. ........................................... 260/491, 260/476 B
[51] Int. Cl. ........................................................... C07c 67/00
[58] Field of Search ........................................ 260/491, 476 R

[56] References Cited

UNITED STATES PATENTS 2,451,739  10/1948  Isler ..................................... 260/491
2,610,207  9/1952  Lindler ................................. 260/491
3,488,736  1/1970  Kardys et al. ........................ 260/491

Primary Examiner—Lorraine A. Weinberger
Assistant Examiner—Vivian Garner
Attorney—Samuel L. Welt, Jon S. Saxe, Bernard S. Leon, William H. Epstein and George M. Gould

[57] ABSTRACT

This invention is directed to a new and improved process for preparing vitamin A alcohol esters by treating 1-alkanoyloxy-6-hydroxy or alkanoyloxy-3, 7-dimethyl-9-[2,6,6-trimethyl-cyclohexen-1-yl]-nonatriene-(2,4,7), with a halogenated hydrocarbon dissolved in an inert organic solvent having a high dipole moment.

14 Claims, No Drawings

PROCESS FOR PREPARING VITAMIN A ESTERS

BACKGROUND OF THE INVENTION

In the past, vitamin A alcohol esters of the formula:

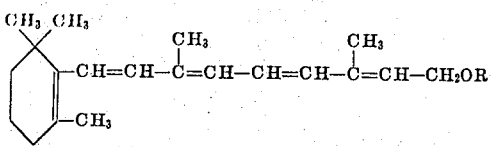

wherein R is acyl; has been prepared by first reacting a compound of the formula:

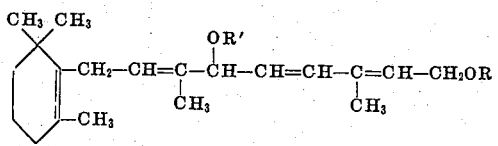

wherein R' is hydrogen or acyl; and R is as above;
dissolved in a halogenated hydrocarbon having a high dipole moment with an aqueous hydrogen halide and then splitting off the hydrogen halide from the resulting halogen compound obtained by dehydrohalogenating with water or a base. This process is generally carried out at a temperature of about -35° C. for a period of about 5 minutes. Under these conditions optimum yields are obtained.

SUMMARY OF THE INVENTION

In accordance with this invention, it has been found that compounds of the formula I can be produced from compounds of the formula II by first reacting the compound of the formula I above dissolved in a halogenated hydrocarbon having a high dipole moment with a solution containing a hydrogen halide dissolved in a halogenated hydrocarbon having a high dipole moment to produce a compound of the formula:

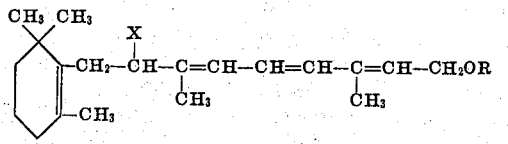

wherein X is halogen; and R is as above; and then splitting off the hydrogen halide from the compound of formula III above.

By utilizing the process of this invention, remarkable reaction velocities are achieved allowing reaction time of less than one second, even at −35° C. This short reaction time has the advantage of enabling the process to be operated continuously by mixing, with an efficient mixing device, the halogenated hydrocarbon solution containing the compound of formula II with the solution containing the hydrogen halide dissolved in the halogenated hydrocarbon solvent. By the process of this invention, only one half the quantity of hydrogen halide as that required by former processes is needed to convert the compound of formula II above to the compound of formula I in high yields. Additionally, the compound of formula II can be converted to the compound of formula I by the process of this invention without the necessity of utilizing extremely low temperatures. Therefore, this process can be carried out utilizing only brine cooling which was not possible when aqueous hydrogen halide was utilized to effect this conversion. Also, the process of this invention provides the compound of formula I above in higher yields than can be obtained by utilizing aqueous hydrogen halide.

The phenomenon whereby vitamin A alcohol esters of formula I can be produced almost instantaneously in higher yields from the compound of formula II utilizing a temperature of about room temperature is not completely understood. However, these beneficial results are directly attributal to the use of hydrogen halide dissolved in a halogenated hydrocarbon solvent. It has been found that the use of a halogenated hydrocarbon solvent having a high dipole moment rather than an aqueous solvent for the hydrogen halide permits this conversion to occur almost instantaneously to produce upon dehydrohalogenation the compound of formula I in high yields without the necessity for providing excessive cooling.

DETAILED DESCRIPTION OF THE INVENTION

The term "halogen" as used throughout the disclosure is intended to encompass all four halogens, i.e., chlorine, fluorine, bromine and iodine with chlorine and bromine being preferred. The term "lower alkyl" as used throughout the disclosure comprehends both straight and branched hydrocarbon groups such as methyl, ethyl, n-propyl, isopropyl and the like. The term "acyl" denotes an organic acid residue. The preferred organic acid residue are lower alkanoyl and aryl lower alkanoyl resides.

The term "lower alkanoyl" denotes lower alkanoyl residues containing from two to seven carbon atoms such as acetyl, propionyl, butyryl, etc. The term "aryl" is employed herein is intended to connote preferentially a phenyl group or a substituted phenyl group such as a lower alkyl phenyl group, preferably tolyl. The preferred aryl lower alkanoyl substituent is benzoyl.

The process of the present invention for the manufacture of vitamin A alcohol esters of the formula I comprises first reacting a solution of the compound of the formula II in a halogenated hydrocarbon solvent having a high dipole moment with a solution of a hydrogen halide in a halogenated hydrocarbon solvent having a high dipole moment to form the compound of the formula III. Therefore, the formation of the compound of the formula III is prepared in a substantially non-aqueous medium. The compound of formula III is then converted to the compound of formula I by splitting off hydrogen halide therefrom in the presence of water and/or a base.

The compounds of formula II which are utilized as starting materials in the process of this invention are well-known materials. For instance, those compounds wherein R is an alkanoyl group and R' is a hydrogen atom are described in Helvetica Chimica Acta, Vol. XXXII (1949) p. 489. The compound of formula II wherein R and R' are both acyl radicals can be prepared by acylating a 1,6-dihydroxy-3,7-dimethyl-9-[2,6,6-trimethyl-cyclohexen-(1)-yl]-nonatriene-(2,4,7). This reaction can be carried out by utilizing any of the conventional means of acylating a hydroxy group.

In carrying out the reaction of this invention, any conventional halogenated hydrocarbon solvent having a high dipole moment can be utilized. Generally it is preferred that conventional halogenated hydrocarbon solvents which have dipole moments of at least $1.18 \times 10^{-18}$ e. s. u. $\times$ cm. be utilized in this reaction. Especially preferred are the halogenated hydrocarbon solvents which have dipole moments of from $1.18 \times 10^{-18}$ e. s. u. $\times$ cm. to about $1.74 \times 10^{-18}$ e. s. u. $\times$ cm.

Halogenated hydrocarbons which are used in the present process can be aliphatic or aromatic in character and are preferably chlorinated hydrocarbons. Among the preferred halogenated hydrocarbon solvents are included chloroform, dichloromethane, dichloroethane, and chlorobenzene with dichloromethane being especially preferred. Also, it is preferred to use the same halogenated hydrocarbon as solvent for the compound of formula II as the halogenated hydrocarbon solvent which is used for the hydrogen halide.

In carrying out this reaction, any of the hydrogen halides can be utilized. However, the preferred hydrogen halides are hydrogen bromide and hydrogen chloride, with hydrogen bromide being especially preferred. In carrying out the reaction of this invention, the hydrogen halide dissolved in the halogenated hydrocarbon solvent having a high dipole moment is added to the compound of formula II dissolved in a halogenated hydrocarbon solvent having a high dipole moment. The hydrogen halide is dissolved in the halogenated hydrocarbon having a high dipole moment prior to its addition to the compound of formula II. This hydrogen halide solution generally contains from about 1 percent to about 10 percent by weight of the hydrogen halide. In carrying out this reaction, at least one mole of the hydrogen halide is present per mole of the compound of formula II. Generally, it is preferred to utilize in this reaction from about 1.0 moles to about 1.1 moles of the hydrogen halide per mole of the compound of formula II. If desired, large excesses of the hydrogen halide can be utilized in carrying out this reaction. However, since no additional beneficial results are achieved by utilizing large amounts of the hydrogen halide in carrying out this reaction, these large excesses are seldom utilized.

This reaction can be carried out at a temperature of from about −45° C. to about 20° C. Generally, it is preferred to utilize a temperature of from −35° C. to about −5° C.

The compound of formula III which is obtained by reacting the compound of formula II with the hydrogen halide is converted into the desired vitamin A ester of formula I by dehydrohalogenating the compound of formula III. Any conventional method of dehydrohalogenating a compound of formula III can be utilized in carrying out this step of the process. Generally, this dehydrohalogenating is carried out in the presence of water and/or a base. If it is desired to utilize a base, any conventional base can be utilized. Among the conventional bases which can be utilized are alkali metal hydroxides such as sodium hydroxide; alkali metal carbonates such as sodium carbonate, potassium carbonate; alkali metal or alkaline earth metal oxides such as calcium oxide; or organic bases such as pyridine and collidine. This reaction is carried out in an aqueous medium. Furthermore, in carrying out this reaction, temperature and pressure are not critical and this reaction can be carried out at room temperature and atmospheric pressure. If desired, higher or lower temperatures can be utilized.

Alternatively, the dehydrohalogenation can be carried out by treating the compound of formula III with large amounts of water. In carrying out this treatment, temperature and pressure are not critical and the dehydrohalogenation can take place at room temperature and atmospheric pressure. If desired, higher or lower temperatures can be utilized. When water is utilized as the means for dehydrohalogenating the compound of formula III, the resulting product is neutralized with a base. Any of the conventional bases mentioned hereinbefore can be utilized in carrying out this neutralization reaction.

A particularly preferred embodiment to the present invention comprises reacting a solution containing the compound of formula II wherein R is acetyl and R' is either hydrogen or acetyl in dichloromethane at a temperature of from −5° to −35° C. utilizing a solution of hydrogen bromide in dichloromethane. After forming the compound of formula III, the hydrogen bromide is split off by treating the compound of formula III with aqueous sodium carbonate.

The instant process will be better understood by reference to the following examples which are given for illustration purposes only and are not meant to limit the invention.

EXAMPLE 1

1,6-Dihydroxy-3,7-dimethyl-9-[2,6,6-trimethyl-cyclohexen-(1)-yl]-nonatriene-(2,4,7) was acetylated by conventional techniques such as by treatment with acetic anhydride or acetyl chloride in the presence of a base followed by removal of the base by washing with an aqueous acid to yield a mixture of 1-acetoxy-6-hydroxy and 1,6-diacetoxy-3,7-dimethyl-9-[2,6,6-trimethyl-cyclohexen-(1)-yl]-nonatriene-(2,4,7).

EXAMPLE 2

250 ml. of a methylene chloride solution containing 37.5 g. of a mixture of 1-acetoxy-6hydroxy and 1,6-diacetoxy-3,7-dimethyl-9-[2,6,6-trimethyl-cyclohexen-(1)-yl]-nonatriene-(2,4,7) and 250 ml. of a solution of hydrogen bromide in methylene chloride were pumped into a mixing vessel cooled to −30° C. at approximately equal rates such that the residence time of the mixture in the reaction vessel was 0.5–1 second [the concentration of the hydrogen bromide solution was adjusted so that 1.1 moles of hydrogen bromide flowed for each mole of the mixture of 1-acetoxy-6-hydroxy and 1,6-diacetoxy-3,7-dimethyl-9-[2,6,6-trimethyl-cyclohexen-(1)-yl]-nonatriene-(2,4,7)]. When about 400 ml. of effluent had been collected in a quench vessel containing 400 ml. of aqueous solution containing 10 percent by weight sodium carbonate, 0.2 ml. of pyridine and 0.1 g. of butylated hydroxytoluene pumping of the two solutions was stopped, then the contents of the quench vessel were stirred at 3° C. for 3 hours. The layers were then separated and the organic layer was washed with 200 ml. of aqueous solution containing 5 percent by weight of sodium bicarbonate. Both aqueous layers were backwashed with 200 ml. of dichloro-methane and the combined organic layers were evaporated in the presence of 0.25 ml. of aqueous solution containing 5 percent by weight of sodium bicarbonate and 0.2 ml. of pyridine using a water pump at 35° C. Crystallization of the residue from methanol gave crystalline vitamin A acetate of 99.3 percent purity having a solidification point of 52.0° C. The yield was 88.3 percent, based on the weight of 1,6-dihydroxy-3,7-dimethyl-9-[2,6,6-trimethyl-cyclohexen-(1)-yl]-nonatriene-(2,4,7) used in the preparation of the starting material.

EXAMPLE 3

The procedure described in Example 2 was carried out using a solution of hydrogen chloride in methylene chloride in place of a solution of hydrogen bromide in methylene chloride. The flow rate was adjusted such that 1.1 mol of hydrogen chloride flowed for each mol of the mixture of 1-acetoxy-6-hydroxy- and 1,6-diacetoxy-3,7-dimethyl-9[2,6,6-trimethyl-cyclohexen-(1)-yl]-nonatriene-(2,4,7). The temperature in the mixing zone was −10° C. After quenching for 24 hours at 20° C. and removal of solvent as described in Example 2, the residual oil was analyzed for vitamin A acetate by ultraviolet spectroscopy. The yield amounted to 80 percent based on the weight of 1,6-dihydroxy-3,7-dimethyl-9-[2,6,6-trimethyl-cyclohexen-(1)-yl]-nonatriene-(2,4,7) used in the preparation of the starting material.

EXAMPLE 4

1,6-Dihydroxy-3,7-dimethyl-9-[2,6,6-trimethyl-cyclohexen-(1)-yl]-nonatriene-(2,4,7) was treated with 1.5 mol of propionyl chloride in the presence of an organic base and the mixture was subsequently worked up and washed with an aqueous acid to yield a mixture of 1-propionoxy-6-hydroxy- and 1,6-dipropionoxy-3,7-dimethyl-9-[2,6,6-trimethyl-cyclohexen-(1)-yl]-nonatriene-(2,4,7).

EXAMPLE 5

250 ml. of a methylene chloride solution containing 37.5 g. of a mixture of 1-propionoxy-6-hydroxy- and 1,6-dipropionoxy-3,7-dimethyl-9-[2,6,6-trimethyl-cyclohexen-(1)-yl]-nonatriene-(2,4,7) and 250 ml. of a solution of hydrogen bromide in methylene chloride were reacted in the same manner as described in Example 2 [the flow rate being adjusted such that 1.1 mol of hydrogen bromide flowed for each mol of the mixture of 1-propionoxy-6-hydroxy- and 1,6-dipropionoxy-3,7-dimethyl-9-[2,6,6-trimethyl-cyclohexen-(1)-yl]-nonatriene-(2,4,7)] and the mixture was worked up as described in Example 2 to yield crude oil which was analyzed for vitamin A propionate content by ultraviolet spectroscopy.

The yield amounted to 90 percent based on the weight of 1,6-dihydroxy-3,7-dimethyl-9-[2,6,6-trimethyl-cyclohexen-(1)-yl]-nonatriene-(2,4,7) used in the preparation of the starting material.

I claim:

1. A process for preparing a vitamin A alcohol ester of the formula:

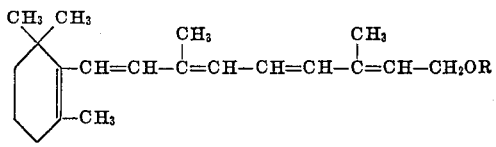

wherein R is lower alkanoyl, phenyl-lower alkanoyl or lower alkyl-phenyl-lower alkanoyl; comprising reacting at a temperature of from about −45° to about 20° C., a compound of the formula:

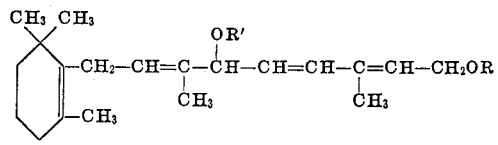

wherein R' is hydrogen or lower alkanoyl, phenyl-lower alkanoyl or lower alkyl-phenyl-lower alkanoyl; and R is as above; dissolved in a halogenated hydrocarbon solvent having a high dipole moment of at least $1.8 \times 10^{-18}$ with a hydrogen halide selected from the group consisting of hydrogen bromide and hydrogen chloride dissolved in a halogenated hydrocarbon solvent having high dipole moment of at least $1.8 \times 10^{-18}$ to form a halide ester of the formula:

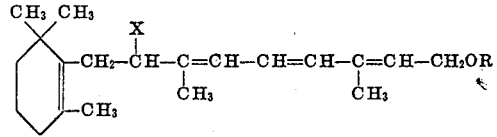

wherein R is as above; and X is a halogen selected from bromine and chlorine; and dehydrohalogenating said halide ester to form said vitamin A alcohol ester.

2. The process of claim 1 wherein said reaction is carried out at a temperature of from about −35°C. to about 5° C.

3. The process of claim 1 wherein said hydrogen halide is hydrogen bromide.

4. The process of claim 1 wherein both of said solvents have a dipole moment in the range of from $1.18 \times 10^{-18}$ e.s. u. × cm. to about $1.74 \times 10^{-18}$ e. s. u. × cm.

5. The process of claim 4 wherein the solvent is dichloromethane.

6. The process of claim 1 wherein R is lower alkanoyl and R' is hydrogen or lower alkanoyl.

7. The process of claim 6 wherein R is acetyl and R' is hydrogen.

8. A process for preparing a halide ester of the formula:

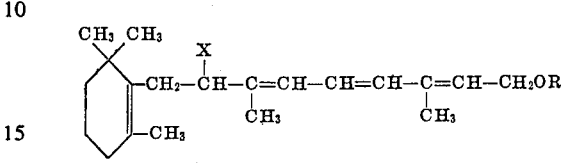

wherein R is lower alkanoyl, phenyl-lower alkanoyl or lower alkyl-phenyl-lower alkanoyl and X is halogen selected from bromine and chlorine; comprising reacting at a temperature of from about −45° C. to about 20° C. a compound of the formula:

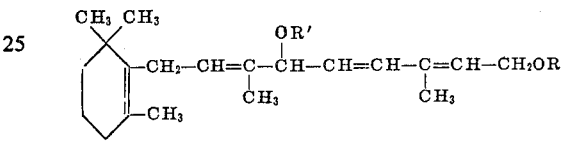

wherein R is as above and R' is hydrogen or lower alkanoyl, phenyl-lower alkanoyl or lower alkyl-phenyl-lower alkanoyl; dissolved in a halogenated hydrocarbon solvent having a high dipole moment of at least $1.8 \times 10^{-18}$ with a hydrogen halide selected from the group consisting of hydrogen bromide and hydrogen chloride dissolved in halogenated hydrocarbon solvent having a high dipole moment of at least $1.8 \times 10^{-18}$.

9. The process of claim 8, wherein said reaction is carried out at a temperature of from about −35° C. to about 5° C.

10. The process of claim 8 wherein said hydrogen halide is hydrogen bromide.

11. The process of claim 8 wherein both of said solvents have a dipole moment in the range of from $1.18 \times 10^{-18}$ e. s. u. × cm. to about $1.74 \times 10^{-18}$ e. s. u. × cm.

12. The process of claim 1 wherein the solvent is dichloromethane.

13. The process of claim 8 wherein R is lower alkanoyl and R' is hydrogen or lower alkanoyl.

14. The process of claim 13 wherein R is acetyl and R' is hydrogen.

* * * * *